(12) United States Patent
Hood

(10) Patent No.: US 10,967,784 B2
(45) Date of Patent: Apr. 6, 2021

(54) VEHICLE CARGO COMPARTMENT LIGHT

(71) Applicant: William Hood, Lake Bluff, IL (US)

(72) Inventor: William Hood, Lake Bluff, IL (US)

( * ) Notice: Subject to any disclaimer, the term of this patent is extended or adjusted under 35 U.S.C. 154(b) by 0 days.

(21) Appl. No.: 16/810,835

(22) Filed: Mar. 5, 2020

(65) Prior Publication Data
US 2020/0282905 A1  Sep. 10, 2020

Related U.S. Application Data

(60) Provisional application No. 62/814,549, filed on Mar. 6, 2019.

(51) Int. Cl.
| | |
|---|---|
| *B60Q 3/30* | (2017.01) |
| *F21S 4/28* | (2016.01) |
| *F21V 3/02* | (2006.01) |
| *B62D 33/04* | (2006.01) |
| *B60Q 3/51* | (2017.01) |
| *F21Y 115/10* | (2016.01) |
| *F21W 106/00* | (2018.01) |
| *F21Y 103/10* | (2016.01) |

(52) U.S. Cl.
CPC ............. *B60Q 3/30* (2017.02); *B60Q 3/51* (2017.02); *B62D 33/04* (2013.01); *F21S 4/28* (2016.01); *F21V 3/02* (2013.01); *F21W 2106/00* (2018.01); *F21Y 2103/10* (2016.08); *F21Y 2115/10* (2016.08)

(58) Field of Classification Search
CPC ...... B60Q 3/30; B60Q 3/51; F21S 4/28; F21V 3/02
See application file for complete search history.

(56) References Cited

U.S. PATENT DOCUMENTS

| | | | | |
|---|---|---|---|---|
| 5,810,468 A | * | 9/1998 | Shimada | F21S 8/032 362/146 |
| 6,152,586 A | * | 11/2000 | Dealey, Jr. | B60Q 3/64 362/485 |
| 2013/0051023 A1 | * | 2/2013 | Huang | F21S 4/28 362/249.14 |
| 2014/0126197 A1 | * | 5/2014 | Dixon | F21L 4/00 362/218 |
| 2017/0167665 A1 | * | 6/2017 | Germain | F21S 4/28 |

* cited by examiner

*Primary Examiner* — Evan P Dzierzynski

(57) ABSTRACT

In one embodiment, a linear light emitting device comprises one or more linear extrusions collectively comprising a horizontal mounting extension, an array of light emitting diodes, a vertical support, and a linear support platform. In one embodiment, the light emitting device comprises a mounting extension that extends from the light emitting device for the bottom surface of the mounting extension to be mounted to a top rail of a vehicle cargo compartment (such as a trailer or cargo compartment of a truck) and a vertical support that positions a linear array of light emitting diodes above the top rail and oriented at a first orientation angle, such as 45 degrees, to the bottom surface of the horizontal mounting surface. In one embodiment, the linear light emitting device is mounted between two roof bows or below one or more roof bows.

20 Claims, 2 Drawing Sheets

VEHICLE CARGO COMPARTMENT LIGHT

BACKGROUND

The subject matter disclosed herein generally relates to light emitting devices such as light fixtures, light bulbs, replacement light bulbs, devices comprising light emitting diodes, and their components and method of manufacture. Light emitting devices are needed within vehicle cargo compartments, such as those of a semi-trailer truck or cargo compartment of a truck, for example, that can survive the tight packing of cargo, fit into the pre-existing interior, and illuminate without shadows.

DETAILED DESCRIPTION OF THE INVENTION

Figure 1:
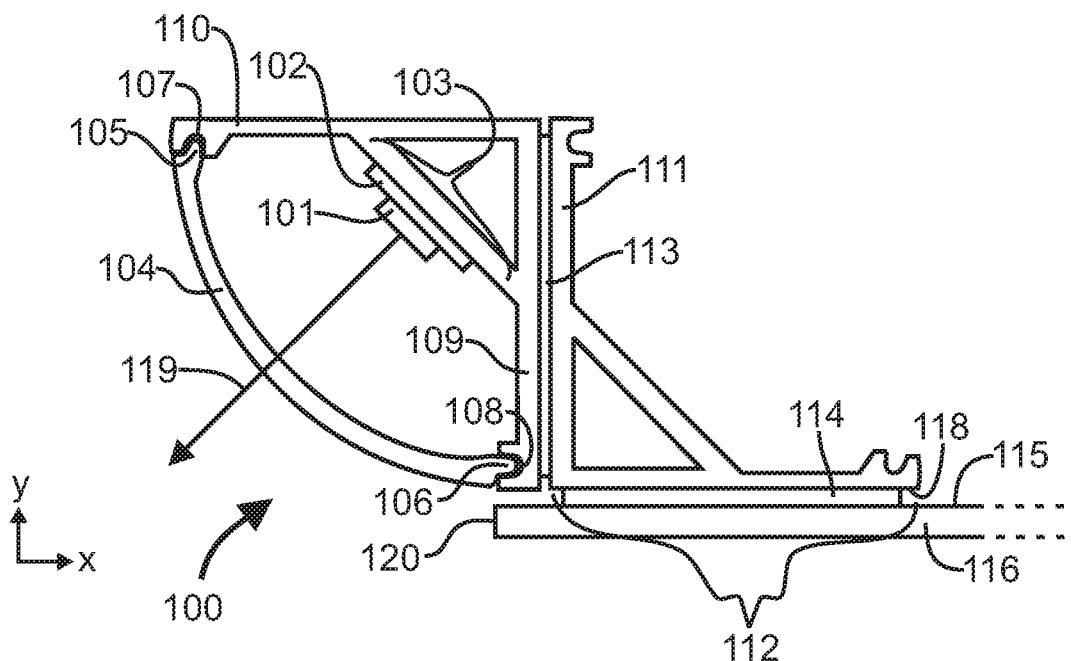
FIG. 1 is a cross-sectional side view of a light emitting device comprising two extrusions.

The features and other details of several embodiments will now be more particularly described. It will be understood that particular embodiments described herein are shown by way of illustration and not as limitations. The principal features can be employed in various embodiments without departing from the scope of any particular embodiment. The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer, section, or property from another region, layer, section, or property. Thus, a first element, component, region, layer, section, or property discussed below could be termed a second element, component, region, layer, section, or property without departing from the teachings of the present inventive subject matter.

Furthermore, relative terms, such as "lower" or "bottom" and "upper" or "top," may be used herein to describe one element's relationship to another element as illustrated in the Figures or description. Such relative terms are intended to encompass different orientations of the device in addition to the orientation depicted in the Figures. For example, if the device in the Figures is turned over, elements described as being on the "lower" or "bottom" side of other elements would then be oriented on the "upper" or "top" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Likewise, "lower side" and "upper side" can therefore, encompass both an orientation of "lower side" and "upper side," depending on the particular orientation of the figure.

For embodiments with a fixed orientation, "lower side," as used herein refers to the region of the device or component in the lower half of the device. Similarly, "upper side," as used herein refers to the region of the device or component in the upper half of the device.

A "linear array" of components as used herein refers to a collection of components with a substantially linear form when examined as a collection. Slight deviations in the placement of the components from a perfectly straight aligned line, such as staggered components, are encompassed in the term linear array when taken as a whole the deviation from a line through the components is not more than 10%. For example, a light emitting device with a dimension of 2 feet in the array direction of the array of LEDs may have LEDs positioned substantially linear along the 2-foot length with a deviation in a direction orthogonal to the array direction of the LEDs of +/−0.2 inches (such as a staggered array) is considered a linear array as disclosed herein.

As referenced herein, a "vehicle cargo compartment" includes the cargo compartment for a vehicle, without regard to the location of the cargo compartment of the vehicle and includes cargo compartments within the vehicle, such as cargo compartments of cargo vans, trucks, or box trucks, and cargo compartments pulled by the vehicle, such as refrigerated or non-refrigerated trailers of a semi-trailer truck, container truck, toy hauler trailer, or truck, for example. The vehicle is not limited to road vehicles and includes trains, aircraft, and watercraft, where the cargo compartment may be a cargo container, for example.

As referenced herein, a "top rail", which is sometimes referenced as a side rail, roof rail, or upper rail, is the rail extending along the side of the vehicle cargo compartment (such as trailer) along the top of the side of the vehicle cargo compartment that supports the roof bows. The "top surface of the top rail" as used herein refers to the top of the portion of the top rail extending into the vehicle cargo compartment that supports the roof bows, which may also be referred to as a ceiling ledge.

Light Emitting Device

In one embodiment, a vehicle cargo compartment light (such as a trailer interior light, for example) comprises: an array of LEDs; a mounting extension (which may be a horizontal mounting extension); a vertical support; and a light transmitting cover, wherein the vertical support positions the LEDs above the lower surface of the mounting extension, the array of LEDs are oriented at about 45 degrees to the mounting extension, the mounting extension positions the array of LEDs beyond the front edge of the top rail such that when the mounting extension is mounted on a top rail of a vehicle cargo compartment (such as a trailer), the light from the array of LEDs is emitted through the light transmitting cover toward the interior region of the vehicle cargo compartment.

In one embodiment, a light emitting device, which may be a linear light emitting device, comprises a mounting extension, an array of light emitting diodes, a vertical support, and a light transmitting cover positioned to receive light from the linear array of LEDs. In one embodiment, the light emitting device comprises a mounting extension that extends from the light emitting device for the bottom surface of the mounting extension to be mounted on the top surface (or other surface such as an inner surface or bottom surface) of a top rail of a vehicle cargo compartment and a vertical support that positions an array of LEDs above the top rail, wherein the LEDs are oriented at a first orientation angle, such as 45 degrees, to the top rail surface when mounted in the vehicle cargo compartment (such as a trailer or cargo compartment of a truck), such as mounted between two roof bows. In embodiments disclosed herein referencing a trailer, a cargo compartment of truck may be used instead, such as cargo compartments comprising a top rail and roof bows, for example. In one embodiment, the light emitting device is an aftermarket device that can be installed after production of the trailer or cargo compartment of a truck.

Vehicle Cargo Compartment Comprising Light Emitting Device

In one embodiment, the vehicle cargo compartment, comprises the light emitting device including a mounting extension that extends from the light emitting device to be mounted within, above, or substantially above, a top rail (above the top of the portion of the top rail extending into the vehicle cargo compartment that supports the roof bows) of a vehicle cargo compartment, a support structure that positions an array of LEDs above the top rail (or above a lower surface of the top rail), wherein the LEDs are oriented at a first orientation angle, such as 45 degrees, to the top rail surface when mounted in the vehicle cargo compartment between two roof bows. In one embodiment, the light emitting device is positioned within or on a surface other than the top or bottom surface of the top rail. For example, the top rail may include a channel wherein the light emitting device is mounted within the channel on a surface between the top and bottom surface.

Mounting Extension

In one embodiment, a light emitting device comprises a mounting extension extending away from the array of light emitting diodes in a first direction orthogonal to the array direction of the light emitting diodes. In embodiments disclosed herein, the mounting extension may be a horizontal extension and extend in a horizontal direction (while optionally extruded in a direction orthogonal to the horizontal direction). In one embodiment, the average dimension of the extension in the first direction is greater than one selected from the group: 0.5, 1, 1.5, 2, 2.5, 3, 3.5, and 4 inches. In one embodiment, the ratio of the total length of the array of light emitting diodes in the array direction to the average dimension of the extension in the first direction is greater than one selected from the group of 3, 4, 5, 6, 7, 8, 9, and 10. In one embodiment, the mounting extension is an extrusion extruded in a direction parallel to the array direction of the array of light emitting diodes.

In one embodiment the mounting extension is adhered, fastened, or otherwise affixed to a surface (such as the top surface, a bottom surface, or a surface between the top surface and bottom surface) of a top rail of a vehicle cargo compartment; one or more roof bows; a roof panel; or one or more side walls, plates, panels, or interior lining panels. In one embodiment, the mounting extension, and thus light emitting device, is mounted to a surface, such as the top surface, of the top rail of a vehicle cargo compartment (or one or more roof bows, a roof panel, or one or more side panels or walls) using one or more method or fastener selected from the group: adhesive, pressure sensitive adhesive, silicone, epoxy, glue, weld, fastener, magnet, pin, threaded fastener, screw, bolt, nut, fixed tab, bendable tab operatively configured to attach components, tie, clamp, clasp, flange, latch, retainer, hook and loop fastener, and rivet. In one embodiment, for example, a kit may comprise the light emitting device, one or more wiring connectors or harnesses, one or more other components disclosed herein, and a high bond strength adhesive tape such as VHB™ tape made by 3M™, for example. In a further embodiment, the mounting extension is configured such that when affixed to the top rail, one selected from the group of 100%, 95%, 90%, 85%, 80%, 75%, 60% and 50% of the cross-sectional area of the light emitting device in a plane orthogonal to the array direction of the LEDs is positioned above a surface (such as the top surface, interior surface, or bottom surface) of the top rail when mounted in a vehicle cargo compartment on the top rail. The mounting extension may position the LEDs away from the front edge of the top rail in a direction toward the storage area of the vehicle cargo compartment. In some embodiments, the mounting extension may position the LEDs recessed from the front edge of the top rail in a direction away from the storage area (or interior) of the vehicle cargo compartment. In one embodiment, the light emitting device is attached to a groove or slot in the top rail or attached to the top and bottom surface of the top rail. In one embodiment, the light emitting device may be positioned between two roof bows and/or attached two one or two roof bows.

Shape of Light Emitting Device

In one embodiment, the light emitting device is substantially linear and the dimension of the light emitting device in the array direction of the array of LEDs (length dimension) is at least 3 times greater than the dimensions of the light emitting device in the first and second mutually orthogonal directions orthogonal to the array direction. In one embodiment, the length of the light emitting device is one selected from the group: between 7 and 37 inches; between 7 and 25 inches; between 7 and 13 inches; between 11 and 13 inches; between 10 and 20 inches; between 18 and 25 inches; greater than 7 inches; and less than 38 inches. In one embodiment, the ratio of the length of the light emitting device in the array direction of the light emitting diodes to the average dimension of the light emitting device in the first direction is greater than one selected from the group of 3, 4, 5, 6, 7, 8, 9, and 10.

Vertical Support and Elevated LED Array

In one embodiment, the light emitting device comprises a vertical support (vertical when mounted in a vehicle cargo compartment) or vertical region that extends the bottom of light emitting regions of the array of light emitting diodes to an average height greater than one selected from the group of 0.25, 0.5, 0.75, 1, 1.25, 1.5, 1.75, 2, 2.25, 2.5, 2.75, 3, 3.25, and 3.5 inches from a surface, such as the top surface or bottom surface, of the top rail of the vehicle cargo compartment or from the bottom surface of the mounting extension. In one embodiment, the vertical support is an extruded aluminum component that may also function as a heat sink for the array of light emitting diodes. In one embodiment, elevating the array of LEDs in a vertical direction from the top of the top rail allows the light to be directed toward the cargo of the vehicle cargo compartment without occlusion from the top rail while keeping the light emitting device substantially above the top rail such that it does not impede or become damaged by cargo. In one embodiment, the light emitting device comprises an extrusion that comprises a mounting extension portion, a vertical support portion, and/or an angle support platform for the LEDs. Thus, a single extrusion may comprise some or all of these functional regions or portions, or each or some of these regions may be individual components physically coupled or fastened together using one or more fastening mechanisms disclosed herein. In one embodiment, the vertical support and the mounting extension are extrusions with the same cross-section rotated and affixed to each other. In one embodiment, the vertical support is an extrusion extruded in a direction parallel to the array direction of the array of light emitting diodes.

Angled LED Array

In one embodiment, the emitting device comprises an array of light emitting diodes oriented at a first orientation angle to the bottom surface of the extension, wall (or side panel) of the vehicle cargo compartment when mounted on a surface of the top rail such as the top surface. In one embodiment, the first orientation angle is one selected from the group: between 10 and 80 degrees; between 20 and 70 degrees; between 30 and 60 degrees; between 40 and 50 degrees; between 42 and 47 degrees; and 45 degrees. In one embodiment, orienting the array of LEDs allows the angle of peak luminous intensity to be oriented more optimally toward the cargo with less shadows or occlusion than orienting the array of LEDs horizontally or vertically.

Angled LED Support Platform

In one embodiment, the light emitting device comprises a support platform (which may be an angled support platform) that supports and orients the linear array of LEDs (optionally via a circuit board comprising the linear array of LEDs) at the first orientation angle. In one embodiment, the support platform is oriented at a support angle to the bottom surface of the extension, wall (or side panel) of the vehicle cargo compartment, or surface, such as the top, interior, or bottom surface, of the top rail when the light emitting device is mounted. In one embodiment, the support angle is the same as the first orientation angle. In one embodiment, the support angle is one selected from the group: between 10 and 80 degrees; between 20 and 70 degrees; between 30 and 60 degrees; between 40 and 50 degrees; between 42 and 47 degrees; and 45 degrees. In one embodiment, the support platform is an extrusion extruded in a direction parallel to the array direction of the array of light emitting diodes.

Directional Light Output Profile

In one embodiment, the light output angular distribution of light from the light emitting device oriented at an angle between 0 degrees and 90 degrees to the lower surface of the mounting extension by the orientation of the support platform, one or more lenses or reflectors, a combination of the support platform orientation and one or more lenses or reflectors. In one embodiment, the light emitting device comprises one or more lenses or reflectors that redirect the angle of peak luminous intensity of the light from the linear array of light emitting diodes. In one embodiment, the light emitting device is configured to emit light with an angle of peak luminous intensity selected from the group: between 30 and 60 degrees; between 40 and 50 degrees; between 42 and 47 degrees; and 45 degrees from the bottom surface of the horizontal mounting extension, wall (or side panel) of the vehicle cargo compartment, or top surface of the top rail when mounted in the vehicle cargo compartment.

Light Transmitting Cover

In one embodiment, the light emitting device comprises a light transmitting cover positioned to receive and transmit light from the linear array of LEDs. In one embodiment, the light transmitting cover is substantially clear and has an ASTM D1003 haze (for a comparable flat section of the same material) less than 5%. In another embodiment, the light transmitting cover is substantially diffuse and has an ASTM D1003 haze (for a comparable flat section of the same material) greater than 5%. In one embodiment, the light transmitting cover comprises acrylic or polycarbonate.

Light Source

In one embodiment, a light emitting device comprises one or more arrays of light sources, such as light emitting diodes. In another embodiment, the one or more arrays of light emitting diodes are mounted on linear circuit boards. In one embodiment, the light emitting device comprises one or more linear sections of circuit boards with discrete LED packages comprising at least one LED die. In another embodiment, a light emitting device comprises a plurality of light sources within one package disposed to emit light toward a surface for illumination. In one embodiment, the light emitting device comprises at least one selected from the group of: 2, 3, 4, 5, 6, 8, 9, 10, 20, 40, 60, 80, 100, 120, 140, 160, 180, 200, 220, 240, 260, 280, 300, 320, 340, 360, 380, and 400 light emitting diodes. In one embodiment, the average dimension, A, of the LEDs in one or more linear arrays of LEDs in a linear direction is less than one selected from the group of 10 mm, 8 mm, 6 mm, 5 mm, 4 mm, 3 mm, and 2 mm. In one embodiment, the light emitting device comprises one or more LEDs of package or case type selected from the group: 0402, 0404, 0603, 0604, 0605, 0606, 0802, 0805, 0806, 0807, 1008, 1050, 1104, 1106, 1204, 1205, 1206, 1208, 1209, 1210, 1305, 1307, 1308, 1411, 1412, 1505, 1608, 1610, 1612, 1616, 1810, 1819, 1908, 1916, 2012, 2024, 2106, 2120, 2122, 2214, 2221, 2220, 2432, 2508, 2520, 2810, 2832, 3010, 3015, 3020, 3022, 3025, 3028, 3034, 3107, 3122, 3228, 3210, 3216, 3224, 3228, 3430, 3519, 3528, 3528, 3632, 4028, 4040, 4234, 4238, 4242, 5050, 5630, 6050, and 7950 where the first two numbers typically represent the length and the second two numbers represent the width in tenths of millimeters. For example, the 5630 LED package type has a length of 5.6 millimeters and a width of 3 millimeters.

Pitch of the Light Sources

In one embodiment, the light emitting device comprises one or more linear arrays of LEDs with an average density greater than one selected from the group of: 2, 3, 4, 5, 6, 7, 8, 9, and 10 LEDs per linear inch. In one embodiment, the pitch, P, of one or more arrays of LEDs is less than one selected from the group of 10 mm, 8 mm, 6 mm, 5 mm, 4 mm, 3 mm, and 2 mm. In one embodiment, within the linear light emitting region of the light emitting device, the average ratio of the dimension in the linear direction of the LED to the average spacing between the LEDs in the linear direction is one selected from the group: 0.5-3.0, 0.5-1.0, 0.8-1.0, 1.0-1.2, 1.2-1.4, 1-1.5, 1.0-2.0, and 1.0-3.0. In another embodiment, the average ratio of the dimension in the linear direction of the LED to the average spacing between the LEDs in the linear direction is less than 5. In another embodiment, the average spacing between the LEDs in one or more linear arrays of LEDs, D, is one selected from the group: 0.1 to 0.5, 0.5 to 1.0, 1.0-1.5, 1.2-1.8, 1.5-2.0, and 1.8-2.2 millimeters.

Spectral Properties of the Light Source

In one embodiment, a light emitting device comprises at least one broadband light source that emits light in a wavelength spectrum larger than 100 nanometers. In another embodiment, a light emitting device comprises at least one narrowband light source that emits light in a narrow bandwidth less than 100 nanometers. In another embodiment, a light emitting device comprises at least one broadband light source that emits light in a wavelength spectrum larger than 100 nanometers or at least one narrowband light source that emits light in a narrow bandwidth less than 100 nanometers. In one embodiment a light emitting device comprises at least one narrowband light source with a peak wavelength within a range selected from the group of 300 nm-350 nm, 350 nm-400 nm, 400 nm-450 nm, 450 nm-500 nm, 500 nm-550 nm, 550 nm-600 nm, 600 nm-650 nm, 650 nm-700 nm, 700 nm-750 nm, 750 nm-800 nm, and 800 nm-1200 nm. The light sources may be chosen to match the spectral qualities of red, green and blue such that collectively when used in a light emitting device, the color may be dialed in to achieve a desired color. In one embodiment, at least one light source is an LED package comprising a red, green, and blue LED capable of emitting light with a white color when each are emitting light. In another embodiment, the LED is a blue or ultraviolet LED combined with a phosphor. In another embodiment, a light emitting device comprises a light source with a first activating energy and a wavelength conversion material which converts a first portion of the first activating energy into a second wavelength different than the first. In another embodiment, the light emitting device comprises at least one wavelength conversion material selected from the group of a fluorophore, phosphor, a fluorescent dye, an inorganic phosphor, photonic bandgap material, a quantum dot material. In another embodiment, the light emitting device comprises white LED light sources. In another embodiment, the light sources comprise LEDs that are at least one selected from the group of: warm white, cool white, neutral white, daylight white, have a correlated color temperature between 2200 K and 2900 K, have a correlated color temperature between 2900 K and 3600 K, have a correlated color temperature between 3600 K and 4500 K, have a correlated color temperature between 4500 K and 4900 K, and have a correlated color temperature between 4900 K and 6600 K.

Luminous Flux Output

In one embodiment, the light emitting device comprises an array of LEDs with an average flux output of one selected from the group: 0.5, 1, 2, 4, 5, 10, and 20 lumens each. In one embodiment, high luminous flux output LEDs are used such that fewer devices may be used to illuminate the interior of the vehicle cargo compartment and/or the vehicle cargo compartment may be illuminated with a sufficiently high illuminance to enable safe, accurate, work such as loading and unloading or repair. In one embodiment, the light emitting device has a maximum luminous flux output greater than one selected from the group: 200, 300, 400, 500, 600, 700, 800, 900, 1000, 1100, and 1200 lumens.

Dimming Modes

In one embodiment, the light emitting device comprises a dimmer that allows the luminous flux output to be dimmed. In one embodiment, one or more of the linear arrays of LEDs or collection of LEDs may be independently dimmed or two or more light emitting devices may be dimmed as a group. In a further embodiment, one or more of the linear arrays of LEDs or collection of LEDs may be dimmed independently or as one or more groups in one or more modes automatically. In one embodiment, the dimming mode comprises a plurality of light adjusting changes, such as a flashing mode that pulsates the light output from one or more linear LED arrays or collection of LEDs or ramps the light output (such as ramping up and ramping down the light flux output repeatedly, for example). In the dimming modes, the flux output may be reduced from the nominal high flux illumination ranges, nominal medium flux illumination ranges, and nominal low flux illumination ranges. In another embodiment, the light output from one or more arrays of LEDs or collection of LEDs may be reduced in one or more discrete increments. For example, in one embodiment, a button on the light emitting device (or external to the light emitting device) may reduce the light output for one or more light emitting devices, arrays of LEDs, or collection of LEDs by 50% of the nominal or full output when pressed. In this embodiment, for example, the light output could further be reduced to 30%, 20%, and 10% of the nominal or full output, by pressing the button for a second, third, and fourth time, respectively.

Color of Illumination

In one embodiment, the one or more arrays of LEDs comprises LEDs with a color temperature (or the average color temperature of the illumination from the LEDs) selected from the group: 2700-3500 (warm white LEDs or illumination), 4000-4500 (cool white LEDs or illumination), 5000-6000 (daylight white LEDs or illumination), 6000-7000 (cool white LEDs or illumination). In one embodiment, one or more arrays or collection of LEDs comprise LEDs with different color temperatures (such as warm white LEDs and daylight white LEDs).

In one embodiment, one or more arrays or collection of LEDs comprise LEDs with different colors (such as white LEDs and red LEDs in a linear array of LEDs or red, green, and blue colored LEDs in a linear array of LEDs).

Control of the Light Emitting Device

In one embodiment, control for the light emitting device is through a user interface at the light emitting device, remote from the light emitting device using a wired connection, or remote from the light emitting device using a wireless connection. In one embodiment, the light emitting device comprises a user interface for controlling the light emitting device at the light emitting device. In one embodiment, the user interface at the light emitting device comprises one or more user interface devices selected from the group: switch, dial, knob, button, pull cord/chain/string, touch sensitive switch or interface (such as a capacitive based touch-sensitive region of the device or a touchscreen, and microphone (for user commands, for example).

In another embodiment, the light emitting device comprises a wired control connection wherein one or more light output properties of the light emitting device is controlled using a wired connection to the light emitting device. In one embodiment, the control connection wired to the light emitting device comprises one or more remote operated wired control devices, such as a user interface (such as three flip switches) in a wall near a door, a user interface on a wall of the vehicle cargo compartment. In one embodiment, a system for controlling a light emitting device comprises a light emitting device and a control module comprising one or more user interfaces operatively configured to control the light emitting device. In one embodiment, the light emitting device receives power from the plug from a trailer to the truck or tractor, the 7-way plug, when running lights are on, from the auxiliary connector, when the door is opened, and/or when a motion sensor/occupancy sensor detects movement or an occupant of the vehicle cargo compartment. In one embodiment, the light emitting device operates on 12 Volt or 24 Volt DC power generated from the tractor or truck, from a battery of the tractor or truck, and/or one or more solar panels on the top of the vehicle cargo compartment.

In another embodiment, the light emitting device comprises a wireless control connection wherein one or more light output properties of the light emitting device are controlled using a wireless connection to the light emitting device. In one embodiment, the wireless control device wireless connected to the light emitting device comprises one or more remote operated wireless control devices, such as a wireless user interface device in a wall near a door, a wireless user interface in the cab of the vehicle, in the truck carrying the trailer, or a portable device (such as controlling the light emitting device using an application on a wireless phone).

In one embodiment controlling light emitting device comprises controlling one or more selected from the group: the light output from one or more arrays of LEDs or collection of LEDs; the illumination mode; the dimming mode; the color changing mode; the power saving mode; the occupancy mode (where information from an occupancy sensor helps determines the light output); power saving mode; daylight mode (where high ambient light detection using one or more photocells reduces the light output from one or more linear arrays of LEDs or collection of LEDs, for example); alarm mode (such as detected emergency event changes the illumination mode to a full illumination mode or a flash dimming mode for one or more linear array of LEDs or collection of LEDs, for example). In one embodiment, a system for controlling a light emitting device comprises a programmable component (such as a non-transitory computer-readable storage device comprising a user definable algorithm for controlling the light emitting device). In one embodiment, programmable component may be used in combination with one or modes, such as programming the light emitting device to be in an energy saving mode if the occupancy sensor does not detect occupancy for the vehicle cargo compartment with the light emitting device mounted above or on a top rail. In one embodiment, the LEDs of the light emitting device are disposed upon a single circuit board. In one embodiment, a first array of LEDs are disposed on a first circuit board, and a second array of LEDs are disposed a second circuit board or the first circuit board.

Other Components of the Light Emitting Device

In one embodiment, the light emitting device or system comprising a light emitting device comprises one or more selected from the group: power supply, driver, battery, photovoltaic cell, photosensor (for detecting ambient light levels or change in light output or color from LEDs over time, for example), occupancy sensor, infrared light sensor, microphone, speaker, alarm, smoke detector, carbon monoxide detector, radio transceiver, microcontroller, non-transitory computer-readable storage medium, and communication interface port (such an RJ11, RJ45, USB, mini-USB, or other electronic device communication transfer port, for example). In one embodiment, the light emitting device comprises an occupancy sensor or door sensor (such as a magnetic sensor) or is electrically or communicatively coupled to the sensor such that the light emitting device emits light when movement is detected, or the door is opened. In one embodiment, the occupancy sensor of the light emitting device is electrically coupled or in communication with a siren, alarm, or remote device to enable an alarm to sound or notification when the door is opened, or movement is detected when the light emitting device or remote controller/device is in alarm mode. In one embodiment, the light emitting device comprises one or more photocells or light sensors that detect high ambient light levels and reduce or turn off the light output from the light emitting device. For example, in one embodiment, light emitting devices mounted in the trailer or cargo compartment within about 10 feet of the door may be configured with light sensors that can detect high ambient light (such as when the truck is loaded in the daytime) and reduce or turn off the light emitting device to save power. In one embodiment, the light emitting device comprises a temperature sensor and is in wireless or electrical communication with a remote device (device exterior to the trailer or cargo compartment) that can monitor the temperature within the trailer (such as by Bluetooth, ZigBee, z-wave, Wi-Fi or other wireless protocol). In this embodiment, monitoring the temperature of the vehicle cargo compartment (such as a trailer or truck) can be helpful for refrigerated trailers or cargo compartments. In another embodiment, the light emitting device comprises a battery backup or is in electrical communication with a battery backup separate from the truck or tractor battery. In one embodiment, the light emitting device comprises a smoke detector or camera.

Power Source

In one embodiment, the light emitting device comprises the power supply or driver for one or more of the linear array of LEDs or collection of LEDs. In another embodiment, the power supply or driver for one or more of the linear array of LEDs or collection of LEDs is remote from the light emitting device.

In one embodiment, the light emitting device is powered by an electrical signal selected from the group of 12V DC, 12V AC, ~110-120V AC, ~220-240V AC, switchable power supply, 28V DC power supply, AC power supply, DC power supply, and 3V DC power supply. In another embodiment, the power supply is a battery supply, or the light emitting device has a backup battery based power supply. In another embodiment, the light emitting device comprises a solar cell and a battery such that the battery can be charged by exposure to light such as sunlight and energy is stored in the battery for future use.

Groove and Extension for Cover Seal

In one embodiment, the light emitting device comprises a linear groove in the vertical support, a heat sink, or housing element and a light transmitting cover with an extension that can slide into or snap into the groove to provide a seal. In one embodiment, the light emitting device comprises a vertical support, heat sink, or an aluminum heat sink vertical support, that comprises a groove on two sides and a light transmitting cover comprises an extension disposed on two sides such that when the extensions are slid or snapped into the groove, a water or moisture resistant seal is formed between the light transmitting cover and the heat sink. In a further embodiment, a gasket (such as a rubber strip) is disposed within the groove such that the seal between the light transmitting cover and the heat sink has a higher water or moisture resistance.

Groove in the Vertical Support or Heat Sink

In one embodiment, the groove disposed in the vertical support, extension, or housing of the light emitting device extends substantially along the length (in the array direction) of the light emitting device. In another embodiment, the groove has an opening width, $G_w$, selected from the group of: between 0.5 mm and 10 mm, between 0.5 mm and 5 mm, between 0.5 mm and 2 mm, and between 0.5 mm and 1.5 mm. In another embodiment, the groove has a uniform depth, $G_d$, selected from the group of: between 0.5 mm and 10 mm, between 0.5 mm and 5 mm, between 0.5 mm and 2 mm, and between 0.5 mm and 1.5 mm. In another embodiment, the groove has a non-uniform depth, with the depth on a first side, $G_{d1}$, selected from the group of: between 0.5 mm and 10 mm, between 0.5 mm and 5 mm, between 0.5 mm and 2 mm, and between 0.5 mm and 1.5 mm; and the depth on a second side, $G_{d2}$, selected from the group of: $G_{d1}+0.5$ mm, $G_{d1}+1$ mm, $G_{d1}+1.5$ mm, $G_{d1}+2$ mm, $G_{d1}+2.5$ mm, $G_{d1}+3.5$ mm, $G_{d1}+4$ mm, $G_{d1}+T1$ (where T1 is the average thickness of the light transmitting cover near the extension), and between $G_{d1}+(0.9 \times T1)$ and $G_{d1}+(1.1 \times T1)$. In another embodiment, the groove depth is non-uniform in the plane perpendicular to the array direction of the array of LEDs.

Extension in Light Transmitting Cover

In one embodiment, the extension in the light transmitting cover of the light emitting device has a depth, d, selected from the group of: between 0.5 mm and 10 mm, between 0.5 mm and 5 mm, between 0.5 mm and 2 mm, between 0.5 mm and 1.5 mm, greater than 0.5 mm, and less than 10 millimeters. In another embodiment, the extension in the light transmitting cover of the light emitting device has a height, h, selected from the group of: between 0.5 mm and 10 mm, between 0.5 mm and 5 mm, between 0.5 mm and 2 mm, between 0.5 mm and 1.5 mm, greater than 0.5 mm, and less than 10 millimeters.

Waterproof

In one embodiment, the light source and electrical components are substantially sealed by at least one of an epoxy, resin, rubber, silicone, or polymer such that the electrical components are waterproof to a depth selected from the group of 5 feet, 10 feet, 20 feet, 30 feet, 50 feet, 100 feet, and 200 feet. In another embodiment, the light emitting device components satisfy the United Laboratories UYMR2 standards for components and fittings intended for use in electric signs and accessories. In another embodiment, the light emitting device continues to operate after a 12 hour continuous salt spray test. In another embodiment, the light emitting device continues to operate after a 24 hour continuous salt spray test. In one embodiment, the light emitting device continues to operate after a 48 hour continuous salt spray test. In one embodiment, the light emitting device continues to operate after a 60 hour salt water soak test. In one embodiment, the light emitting device continues to operate after a 120 hour salt water soak test. In another embodiment, the light emitting device continues to operate after a 240 hour salt water soak test.

The following are more detailed descriptions of various embodiments illustrated in the Figures.

FIG. 1 is a cross-sectional side view of an embodiment of a light emitting device 100 linear the z direction comprising a first extrusion 110 and second extrusion 111 bonded together using a high bond strength pressure sensitive adhesive 113, an array of LEDs 101 (arrayed in the z direction) on a circuit board 102 physically coupled to an angled LED support platform 103 of the first extrusion 110, and a light transmitting cover 104 with linear extensions 105, 106 positioned into linear grooves 107, 108, in the first extrusion 110, respectively. In this embodiment, when the light emitting device 100 is mounted in a vehicle cargo compartment, the array of LEDs 101 are oriented at a first orientation angle (45 degrees as shown) to the top surface 115 of a top rail 116 of a vehicle cargo compartment and to the bottom surface 118 of the mounting extension 112 of the second extrusion 111. The mounting extension 112 extends from the light emitting device 100 in the first direction (+x direction or horizontal direction) orthogonal to the array direction (−z direction into the page as shown) of the array of LEDs 101. In this embodiment, the angle of peak luminous intensity of the light 119 from the LEDs 101 is also at the first orientation angle (45 degrees in this embodiment). The first extrusion 110 comprises a vertical support 109 that positions the LEDs 101 above the top surface 115 of the top rail 116 of the vehicle cargo compartment. In this embodiment, the light emitting device 100 is bonded to the top surface 115 of the top rail 116 of the vehicle cargo compartment by bonding a mounting extension 112 of the second extrusion 111 to the top surface 115 using a high bond strength pressure sensitive adhesive 114. The mounting extension 112 positions the LEDs 101 away from the front edge 120 of the top rail 116 in a direction toward the storage area of the vehicle cargo compartment (in the −x direction as shown in FIG. 1) while maintaining sufficient surface area extended in the +x direction over the top surface 115 to provide a high strength bond for the light emitting device 100 to be bonded to the top surface 115 of the top rail 116. In the embodiment shown in FIG. 1, the second extrusion 111 has the same cross-sectional shape (in a plane orthogonal to the array direction of the array of LEDs, x-y plane in this example) as the first extrusion 110 but rotated 180 degrees clockwise.

Figure 2:
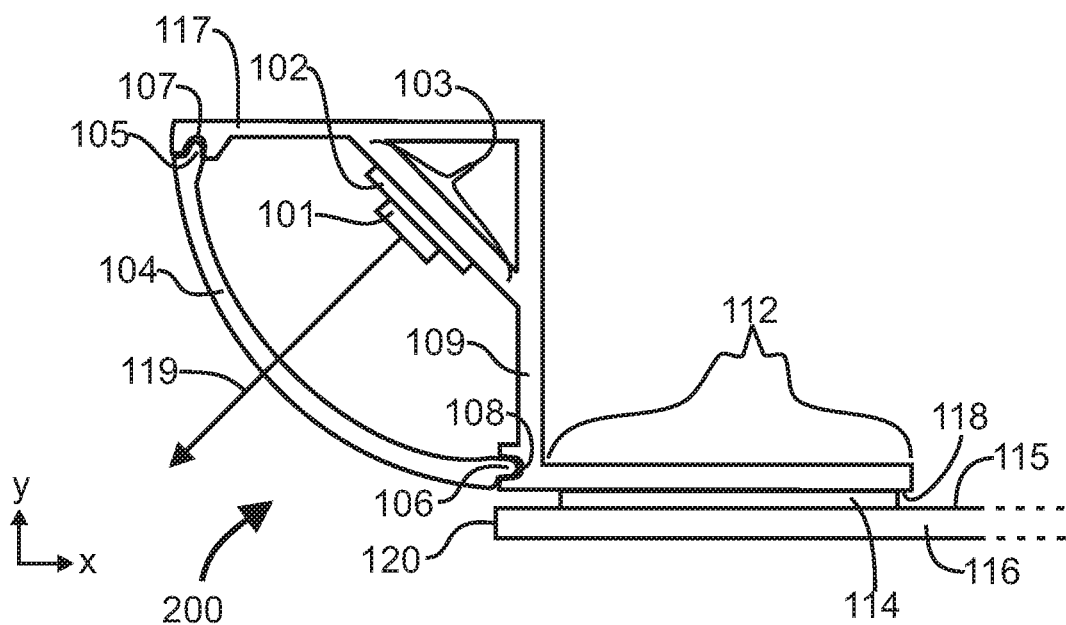
FIG. 2 is a cross-sectional side view of a light emitting device comprising one extrusion.

FIG. 2 is a cross-sectional side view of an embodiment of a light emitting device 200 linear the z direction comprising an extrusion 117 (such as an aluminum extrusion), an array of LEDs 101 (arrayed in an array direction (the z direction)) on a circuit board 102 physically coupled to an angled LED support platform 103 of the extrusion 117, and a light transmitting cover 104 with linear extensions 105, 106 positioned into linear grooves 107, 108, in the extrusion 117, respectively. In this embodiment, when the light emitting device 200 is mounted in a vehicle cargo compartment, the array of LEDs 101 are oriented at a first orientation angle (45 degrees as shown) to the top surface 115 of a top rail 116 of a vehicle cargo compartment and to the bottom surface 118 of the mounting extension 112 of the extrusion 117. The mounting extension 112 extends from the light emitting device 200 in the first direction (+x direction or horizontal direction) orthogonal to the array direction (−z direction into the page as shown) of the array of LEDs 101. In this embodiment, the angle of peak luminous intensity of the light 119 from the LEDs 101 is also at the first orientation angle (45 degrees in this embodiment). The extrusion 117 comprises a vertical support 109 that positions the LEDs 101 above the top surface 115 of the top rail 116 of a vehicle cargo compartment. In this embodiment, the light emitting device 100 is bonded to the top surface 115 of the top rail 116 of the vehicle cargo compartment by bonding the mounting extension 112 of the extrusion 117 to the top surface 115 using a high bond strength pressure sensitive adhesive 114. The mounting extension 112 of the extrusion 117 positions the LEDs 101 away from the front edge 120 of the top rail 116 in a direction toward the storage area of the vehicle cargo compartment (in the −x direction as shown in FIG. 1) while maintaining sufficient surface area extended in the +x direction over the top surface 115 to provide a high strength bond for the light emitting device 200 to be securely bonded to the top surface 115 of the top rail 116.

Figure 3:
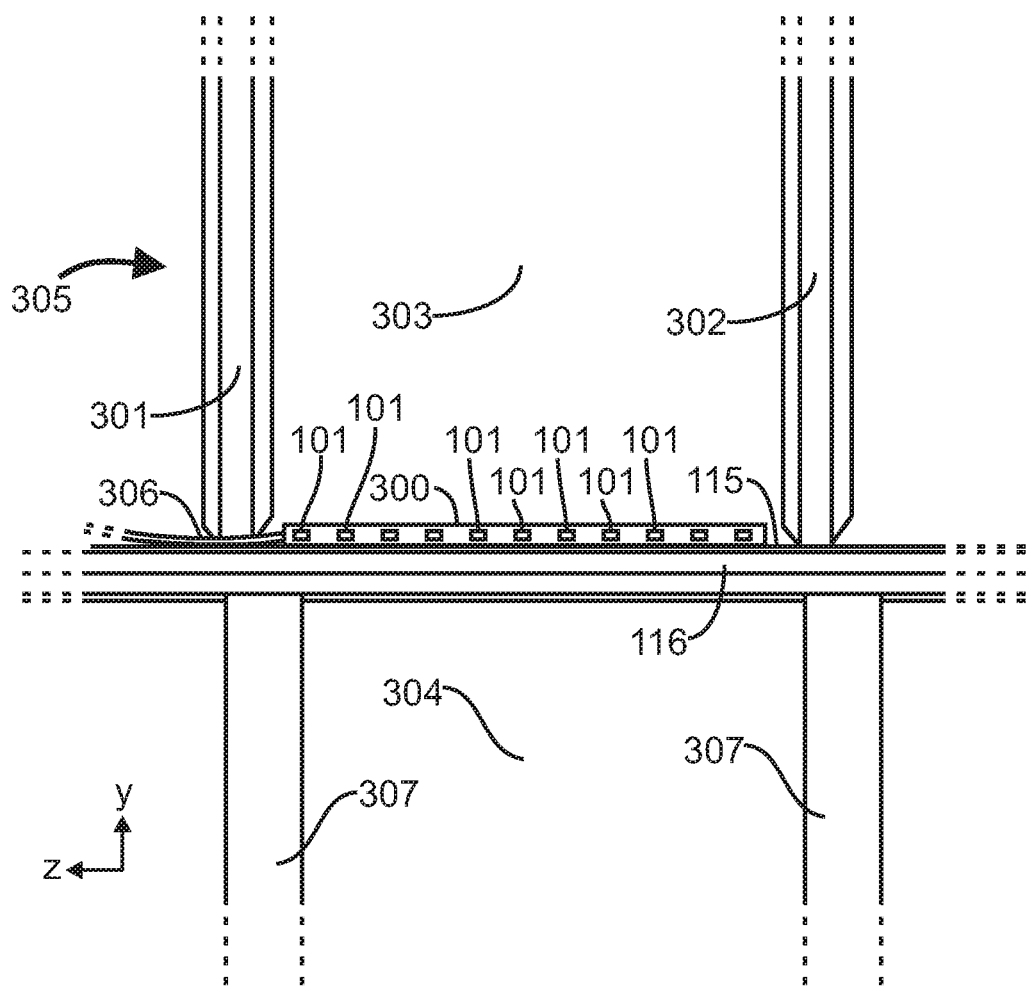
FIG. 3 is a bottom perspective view looking into a top corner of a vehicle cargo compartment comprising a light emitting device.

FIG. 3 is a bottom perspective view looking into a top corner of a vehicle cargo compartment 305 comprising a light emitting device 300 (which may be the light emitting device 100 comprising two extrusions or the light emitting device 200 comprising one extrusion, for example) wherein the light emitting device 300 is mounted into the vehicle cargo compartment 305 by bonding the lower surface of the mounting extension of the light emitting device 300 onto the top surface 115 of the top rail 116 (above the top of the portion of the top rail extending into the vehicle cargo compartment that supports the roof bows) between a first bow 301 and second bow 302 extending across the roof 303. The light emitting device 300 comprises a linear array of LEDs 101 (seen through the light transmitting cover) in an array direction (−z direction as shown) and a power cable 306 extending from the light emitting device and positioned under the first bow 301. The light emitting device is positioned above the top rail 116 which is positioned above the side panel 304 and side posts 307.

EQUIVALENTS

Those skilled in the art will recognize or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. This application is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius.

What is claimed is:

1. A linear light emitting device for mounting in an interior of a vehicle cargo compartment, comprising:

one or more linear extrusions collectively comprising a horizontal mounting extension, a vertical support physically coupled to the horizontal mounting extension, and a linear support platform physically coupled to the vertical support and oriented at an angle between 30 and 60 degrees to a bottom surface of the horizontal mounting extension; and a linear array of light emitting diodes physically and thermally coupled to the linear support platform, wherein the horizontal mounting extension extends behind the linear array of light emitting diodes in a first direction parallel to a horizontal direction and is configured to be mounted to a top rail of the vehicle cargo compartment, and the vertical support positions the linear array of light emitting diodes above the bottom surface of the horizontal mounting extension in a vertical direction.

2. The linear light emitting device of claim 1 wherein the horizontal mounting extension is configured to mount to the top rail of the vehicle cargo compartment such that when the linear light emitting device is mounted on a surface of the top rail of the vehicle cargo compartment, the linear array of light emitting diodes is positioned above the surface of the top rail and past a front edge of the top rail toward the interior of the vehicle cargo compartment.

3. The linear light emitting device of claim 2 wherein the horizontal mounting extension is configured to mount to the top rail of the vehicle cargo compartment such that when the linear light emitting device is mounted on a surface of the top rail of the vehicle cargo compartment, the linear light emitting device is positioned between two adjacent roof bows of the cargo compartment.

4. The linear light emitting device of claim 1 wherein the horizontal mounting extension is configured to mount to the top rail of the vehicle cargo compartment such that when the linear light emitting device is mounted on a surface of the top rail of the vehicle cargo compartment the linear array of light emitting diodes is positioned above the surface of the top rail and recessed from a front edge of the top rail away from the interior of the vehicle cargo compartment.

5. The linear light emitting device of claim 4 wherein the horizontal mounting extension is configured to mount to the top rail of the vehicle cargo compartment such that when the linear light emitting device is mounted on a surface of the top rail of the vehicle cargo compartment, the linear array of light emitting diodes is positioned between two adjacent roof bows of the cargo compartment.

6. The linear light emitting device of claim 1 further comprising an adhesive tape on the bottom surface of the horizontal mounting extension.

7. The linear light emitting device of claim 1 wherein a length of the linear light emitting device in a direction parallel to an array direction of the array of linear light emitting diodes is greater than 7 inches and less than 38 inches.

8. The linear light emitting device of claim 7 wherein the one or more linear extrusions is two extrusions.

9. The linear light emitting device of claim 7 wherein the one or more linear extrusions is one linear extrusion.

10. The linear light emitting device of claim 7 wherein an angular peak luminous intensity of light from the linear light emitting device is between 30 and 60 degrees from the bottom surface of the horizontal mounting extension.

11. A method of illuminating an interior of a vehicle cargo compartment comprising:

fastening a linear light emitting device to a top rail of the vehicle cargo compartment, the linear light emitting device comprising one or more linear extrusions collectively comprising a horizontal mounting extension, a vertical support physically coupled to the horizontal mounting extension, and a linear support platform physically coupled to the vertical support and oriented at an angle between 10 and 80 degrees to a bottom surface of the horizontal mounting extension, the linear light emitting device further comprising a linear array of light emitting diodes physically and thermally coupled to the linear support platform, such that the linear array of light emitting diodes is positioned above a bottom surface of the top rail and past a front edge of the top rail toward the interior of the vehicle cargo compartment.

12. The method of claim 11 further comprising orienting the linear light emitting device such that an angular peak luminous intensity of light from the linear light emitting device illuminating the interior of the vehicle cargo compartment is between 30 and 60 degrees from the bottom surface of the horizontal mounting extension.

13. The method of claim 12 wherein the linear support platform is oriented at an angle between 30 and 60 degrees to a bottom surface of the horizontal mounting extension.

14. The method of claim 11 wherein fastening a linear light emitting device to a top rail of the vehicle cargo compartment fastens the linear light emitting device between two adjacent roof bows of the cargo compartment.

15. The method of claim 11 wherein fastening a linear light emitting device to a top rail of the vehicle cargo compartment positions the linear light emitting device below one or more roof bows of the cargo compartment.

16. The method of claim 11 wherein the interior of the vehicle cargo compartment comprises the interior of a semi-trailer truck, a cargo compartment of a truck, or a cargo compartment of a van.

17. The method of claim 11 further comprising orienting the linear light emitting device such that an angular peak luminous intensity of light from the linear light emitting device illuminating the interior of the vehicle cargo compartment is between 30 and 60 degrees from the bottom surface of the horizontal mounting extension.

18. A method of illuminating an interior of a vehicle cargo compartment comprising:
fastening a linear light emitting device to a top rail of the vehicle cargo compartment, the linear light emitting device comprising one or more linear extrusions collectively comprising a horizontal mounting extension, a vertical support physically coupled to the horizontal mounting extension, and a linear support platform physically coupled to the vertical support and oriented at an angle between 30 and 60 degrees to a bottom surface of the horizontal mounting extension, the linear light emitting device further comprising a linear array of light emitting diodes physically and thermally coupled to the linear support platform, such that the linear array of light emitting diodes is positioned above a bottom surface of the top rail and recessed from a front edge of the top rail away from the interior of the vehicle cargo compartment.

19. The method of claim 18 wherein fastening a linear light emitting device to a top rail of the vehicle cargo compartment positions the linear light emitting device between two adjacent roof bows of the cargo compartment.

20. The method of claim 18 wherein fastening a linear light emitting device to a top rail of the vehicle cargo compartment positions the linear light emitting device below one or more roof bows of the cargo compartment.

* * * * *